(12) United States Patent
Honda

(10) Patent No.: US 7,200,466 B2
(45) Date of Patent: Apr. 3, 2007

(54) PARTS ASSEMBLY MANAGEMENT SYSTEM

(75) Inventor: Hajime Honda, Kumamoto Pref. (JP)

(73) Assignee: Honda Motor Co., Ltd., Tokyo (JP)

( * ) Notice: Subject to any disclaimer, the term of this patent is extended or adjusted under 35 U.S.C. 154(b) by 242 days.

(21) Appl. No.: 10/996,569

(22) Filed: Nov. 23, 2004

(65) Prior Publication Data

US 2005/0113949 A1    May 26, 2005

(30) Foreign Application Priority Data

Nov. 26, 2003   (JP)  ............................ 2003-396266

(51) Int. Cl.
*G06F 7/00*   (2006.01)
*G06K 7/10*   (2006.01)

(52) U.S. Cl. ...................... 700/225; 700/216; 700/215; 700/213; 700/230; 235/462.06

(58) Field of Classification Search ................ 700/216, 700/215, 213, 225–230, 222, 245, 258–259; 235/462.06, 462.01, 462.09, 462.1, 462.17
See application file for complete search history.

(56) References Cited

U.S. PATENT DOCUMENTS

| | | | | |
|---|---|---|---|---|
| 5,128,527 A | * | 7/1992 | Kawai et al. | .......... 235/462.07 |
| 5,165,219 A | * | 11/1992 | Sekiguchi et al. | ............ 53/493 |
| 5,838,648 A | * | 11/1998 | Litsche et al. | ............. 369/52.1 |
| 5,886,337 A | * | 3/1999 | Rockstein et al. | ..... 235/472.01 |
| 5,943,476 A | * | 8/1999 | Dougherty et al. | ......... 700/259 |
| 6,076,734 A | * | 6/2000 | Dougherty et al. | .... 235/462.01 |
| 6,158,660 A | * | 12/2000 | Blanford et al. | ....... 235/462.11 |
| 6,314,337 B1 | * | 11/2001 | Marcum | ..................... 700/216 |
| 6,540,141 B1 | * | 4/2003 | Dougherty et al. | .... 235/462.01 |

FOREIGN PATENT DOCUMENTS

| | | |
|---|---|---|
| JP | 2001-202115 | 7/2001 |
| JP | 2002-082708 | 3/2002 |

* cited by examiner

*Primary Examiner*—Thomas K. Pham
(74) *Attorney, Agent, or Firm*—Carrier, Blackman & Associates, P.C.; Joseph P. Carrier; William D. Blackman

(57) ABSTRACT

A parts assembly management system includes a parts assembly management apparatus to be installed in an assembly line, and a plurality of storage vessel identifying apparatuses to be installed in a plurality of storage vessels. The parts assembly management apparatus includes a reading apparatus, and a first processing unit. The reading apparatus contactlessly reads a product identifier identifying the product from an IC tag attached to the product. The processing unit extracts a vessel identifier associated with the product identifier identifying the product from an assembling table. Each of the storage vessel identifying apparatuses includes a receiving unit, a second processing unit, and an output unit. The receiving unit receives the extracted vessel identifier from the parts assembly management apparatus. The processing unit performs comparison between the associated vessel identifier received by the receiving unit and a specific vessel identifier identifying the associated vessel. The output unit outputs a result of the comparison.

10 Claims, 14 Drawing Sheets

Fig. 5

| | | | | |
|---|---|---|---|---|
| PROCESS STEP 1 | | | | |
| VEHICLE BODY NUMBER | 12345 | 67890 | 13579 | · · · |
| PART NUMBER | A-1 | A-1 | A-2 | · · · |
| | B-3 | B-1 | B-2 | · · · |
| | C-1 | C-1 | C-3 | · · · |
| | ····· | ····· | ····· | · · · |

54 — PROCESS STEP 1
26 — VEHICLE BODY NUMBER
56 — PART NUMBER
38

Fig. 6

| BOX-No. | PART NUMBER |
|---|---|
| 001 | A-1 |
| 002 | B-4 |
| 003 | A-2 |
| ····· | ····· |

| PROCESS STEP 1 | | | | | | | |
|---|---|---|---|---|---|---|---|
| VEHICLE BODY NUMBER | 12345 | | 67890 | | 13579 | | · · · |
| PART NUMBER | A-1 | ☑ | A-1 | ☑ | A-2 | ☐ | · · · |
| | B-3 | ☑ | B-1 | ☑ | B-1 | ☐ | · · · |
| | C-1 | ☑ | C-1 | ☐ | C-1 | ☐ | · · · |
| | · · · · · | ☐ | · · · · · | ☐ | · · · · · | ☐ | · · · |
| ASSEMBLY INSTRUCTION | ○○○○ | | ××××  | | △△△△ | | · · · |

Fig. 15

| PART ID | A-1-0001 | A-1-0002 | ... | A-2-0001 | ... | A-3-0001 | ... |
|---|---|---|---|---|---|---|---|
| CURRENT DISTANCE FROM READING APPARATUS | 380 | 40 | ... | 75 | ... | 115 | ... |
| DISTANCE FROM READING APPARATUS WHICH IS MEASURED ONE SECOND AGO | 40 | 35 | ... | 75 | ... | 115 | ... |
| TRAVELING DISTANCE | 340 | 5 | ... | 0 | ... | 0 | ... |

Fig. 16

| PROCESS STEP 1 | PART ASSEMBLY DISTANCE | ~300 | | |
|---|---|---|---|---|
| VEHICLE BODY NUMBER | | 12345 | 67890 | ··· |
| DISTANCE FROM READING APPARATUS | | 600 | 200 | ··· |
| ASSEMBLED PARTS LIST | | A-1-0001 | A-1-0002 | |
| | | B-3-0001 | B-1-0001 | |
| | | C-1-0001 | | |
| PARTS ASSEMBLY STATUS | | COMPLETE | INCOMPLETE | |

PARTS ASSEMBLY MANAGEMENT SYSTEM

BACKGROUND OF THE INVENTION

1. Field of the Invention

The present invention is related to systems for facilitating parts assembly processes in manufacture of industrial products.

2. Description of the Related Art

Industrial products, including automobiles and motorbikes, are often manufactured by conveyer systems. Within a conveyer system, products are conveyed along an assembly line by belt conveyers, or the like, and parts are assembled to the products by workers arranged at predetermined positions. Workers are obliged to assemble the parts to the products conveyed on the line with reference to work instruction manuals.

A production management system is known in Japanese Laid-open Patent Application NO.2001-202115, by which parts are assembled into products using information recording media containing product identifying information, and parts identifying information. The product identifying information is used for identifying the products, while the parts identifying information is used for identifying parts to be assembled to the respective products.

Highly sophisticated products whose sales are strongly dependent on user's preference, such as motorbikes and automobiles, are often required to satisfy various sorts of user's requirements, including variations and options of the products. To meet various users' requirements, different parts are required to be assembled into products on the same assembly line. There is a need for providing a technique for improving efficiency in assembling various kinds of parts into products on a single assembly line.

SUMMARY OF THE INVENTION

Therefore, an object of the present invention is to provide a parts assembly management system for performing parts assembling processes with an improved efficiency.

Another object of the present invention is to provide a parts assembly management system for decreasing total man-hours for checking resultant products.

Still another object of the present invention is to provide a parts assembly management system for improving traceablity of products and parts incorporated therein, from parts manufacture to product distribution.

Still another object of the present invention is to provide a parts assembly management system for easily changing manufacture process sequences, or for readily replacing workers in assembly lines for assembling parts to products.

In an aspect of the present invention, a parts assembly management system is composed of a parts assembly management apparatus to be installed in an assembly line for automatically conveying a product, and a plurality of storage vessel identifying apparatuses to be installed in a plurality of storage vessels which store therein parts to be assembled to the product. The parts assembly management apparatus includes a reading apparatus, a storage unit, a processing unit, and a transmitting unit. The reading apparatus is designed to contactlessly read a product identifier identifying the product from an IC tag attached to the product. The storage unit stores therein an assembly table containing an association of product identifiers with vessel identifiers identifying the plurality of the storage vessels. The processing unit is designed to extract, out of the vessel identifiers within the assembly table, a vessel identifier associated with the product identifier identifying the product. The transmitting unit transmits the associated vessel identifier to the storage vessel identifying apparates. Each of the storage vessel identifying apparatuses, on the other hand, includes a receiving unit, a storage unit, a processing unit, and an output unit. The receiving unit receives the associated vessel identifier from the transmitting unit. The storage unit stores therein a specific vessel identifier identifying an associated one of the storage vessels. The processing unit performs comparison between the associated vessel identifier received by the receiving unit and the specific vessel identifier. Finally, the output unit outputs a result of the comparison.

Preferably, the parts assembly management system additionally includes a shutter mechanism for opening or closing an associated one of the storage vessels in response to the result of the comparison.

In another aspect of the present invention, a parts assembly management apparatus, adapted to an assembly line automatically conveying a product, is composed of a storage unit, a product reading apparatus, a parts reading apparatus, a first output unit, a processing unit, and a second output unit. The storage unit stores therein an assembly table containing an association of a product identifier identifying the product with parts identifiers identifying parts to be assembled to the product. The product reading apparatus is designed to contactlessly read a product identifier from a product IC tag attached to the product. The parts reading apparatus is designed to contactlessly read parts identifiers from parts IC tags attached to parts. The first output unit displays thereon an assembling instruction associated with a product identifier identifying the product. The processing unit is designed to calculate respective traveling distances over which the parts IC tags have traveled during a predetermined period of time, to extract a specific parts identifier stored in a specific parts IC tag which has traveled over a traveling distance exceeding a predetermined value, and to perform comparison between the specific parts identifier and the parts identifiers associated with the product identifier read from the product IC tag by the product reading apparatus with reference to the assembling table. The second output unit outputs a result of the comparison.

Preferably, the processing unit is designed to determine distances between the parts reading apparatus and the parts by employing a duration required for an exchange of electromagnetic waves between the parts reading apparatus and the parts IC tags, and a propagation speed of the electromagnetic waves, and to calculate the traveling distances of the parts IC tags based on differences in the distances between the parts reading apparatus and the parts at a beginning and end of the predetermined period.

BRIEF DESCRIPTION OF THE DRAWINGS

For a better understanding of the present invention, reference is made of a detailed description to be read in conduction with the accompanying drawings:

FIG. 5 is a diagram for illustratively showing a structure of an assembly table employed in the parts assembly management system of FIG. 1;

FIG. 6 is a diagram for illustratively showing a structure of a parts storage table employed in the parts assembly management system of FIG. 1;

FIG. 14 is a diagram for illustratively indicating a structure of an assembly table employed in the parts assembly management system of FIG. 10;

FIG. 15 is a diagram for illustratively showing a structure of a parts traveling distance management table employed in the parts assembly management system of FIG. 10;

FIG. 16 is a diagram for illustratively indicating a structure of a product position management table employed in the parts assembly management system of FIG. 10.

DESCRIPTION OF THE PRESENT EMBODIMENTS

Referring now to drawings, various parts assembly management systems according to the present invention will be described in detail.

Figure 1:
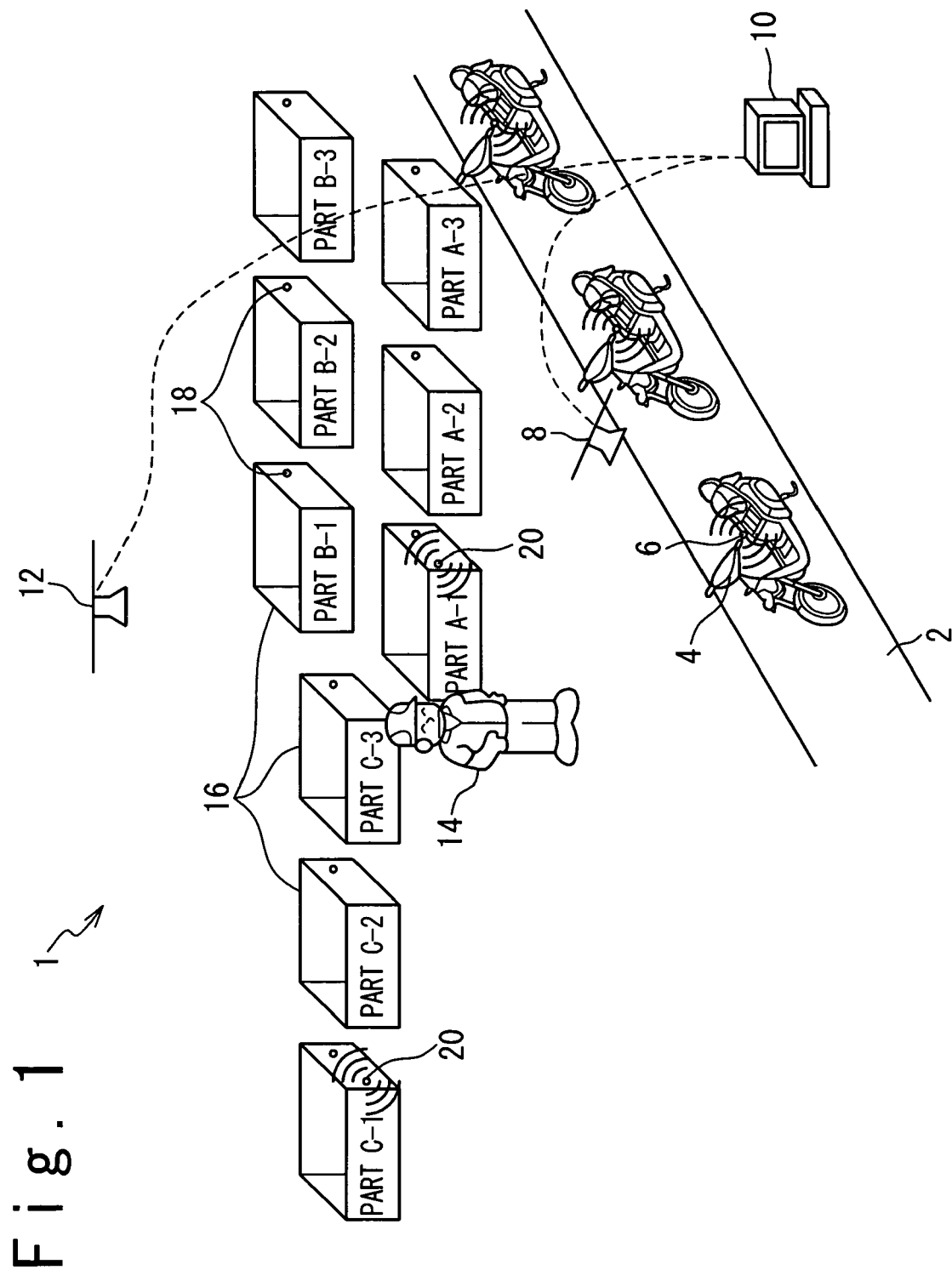
FIG. 1 is a diagram for illustratively showing an entire arrangement of a parts assembly management system according to an embodiment of the present invention.

FIG. 1 illustratively shows an entire arrangement of a parts assembly management system 1 in one embodiment of the present invention. In this embodiment, the parts assembly management system 1 is used in combination with an assembly line 2 conveying vehicles 4. The assembly line 2 is typically equipped with a belt conveyor. It should be understood that the parts assembly management system 1 according to the embodiment of the present invention may be alternatively used in combination with an assembly line for assembling computers, electronic appliances, and so on. A worker 14 is arranged at a predetermined position of the assembly line 2. The worker 14 is obliged to assemble appropriate parts into the vehicles 4.

IC tags 6 adapted to an RF-ID (Radio Frequency Identification) system are attached to the vehicles 4. Necessary information is previously stored in the IC tags 6 before the vehicles 4 are loaded on the assembly line 2, and the resulting IC tags 6 are attached to the vehicles 4. A reading apparatus 8 adapted to the RF-ID system is installed at a predetermined position of the assembly line 2. The reading apparatus 8 is designed to read the information stored in the IC tags 6. It should be noted that a portable terminal or a rigidly fixed device may be used as the reading apparatuses 8. The use of a fixed device as the reading apparatus 8 has an advantage that the worker 14 need not hold the reading apparatus 8 by his or her hand. Preferably, the reading apparatus 8 is provided for each position where the worker 14 is located.

The reading apparatus 8 is connected to a parts assembly management terminal 10. A personal computer or a workstation may be used as the parts assembly management terminal 10. The parts assembly management terminal 10 is connected to a transmission apparatus 12.

A plurality of parts storage boxes 16 are provided along the assembly line 2 for storing parts to be assembled into the vehicles 4. Each parts storage box 16 stores therein a preselected sort of parts. Each of the parts storage boxes 16 is composed of an IC tag 18 and a light-emitting unit 20. The IC tag 18 receives a signal transmitted from the transmission apparatus 12.

Figure 2:
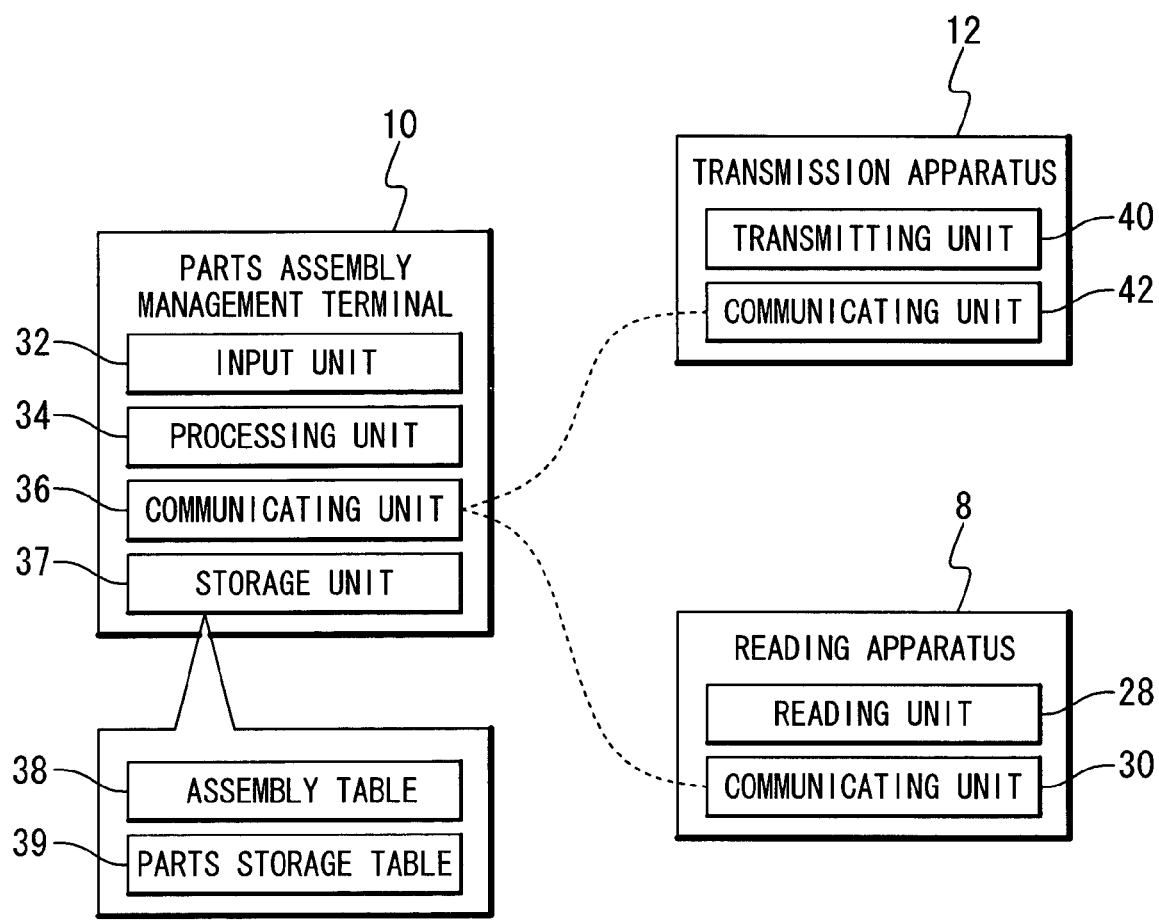
FIG. 2 is a schematic block diagram illustrating an electronic arrangement of the parts assembly management system shown in FIG. 1.
Figure 3:
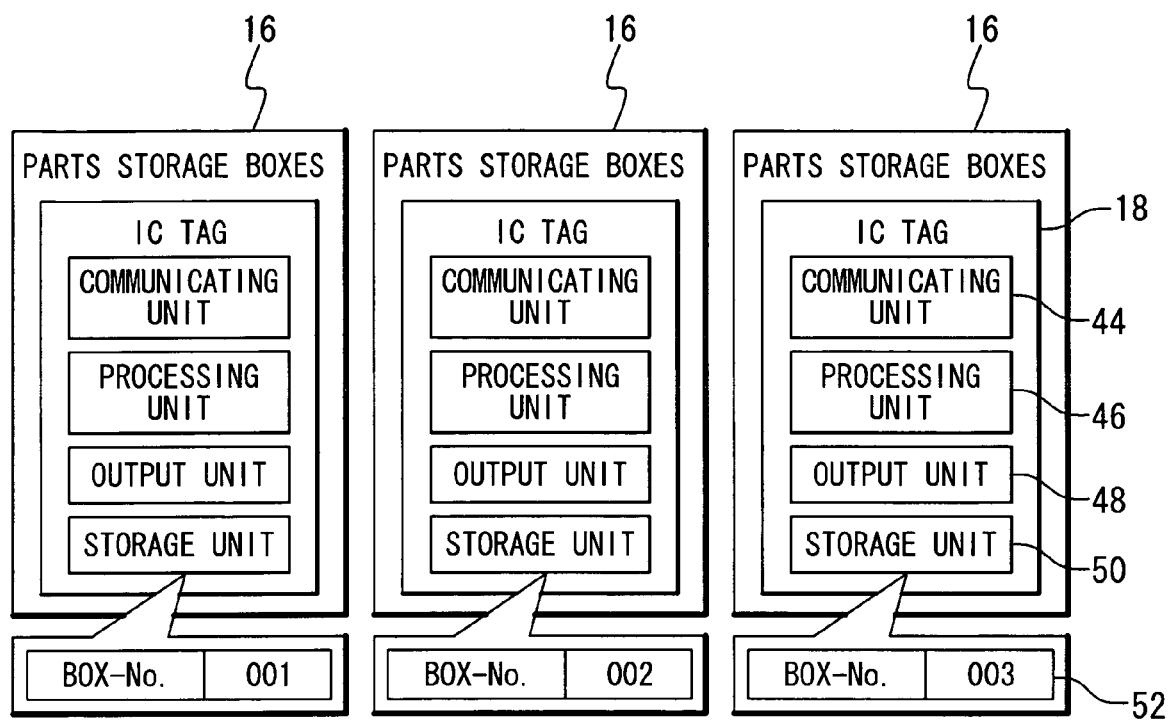
FIG. 3 is a diagram for illustratively showing a structure of an IC tag attached to a parts storage box employed in the parts assembly management system of FIG. 1.
Figure 4:
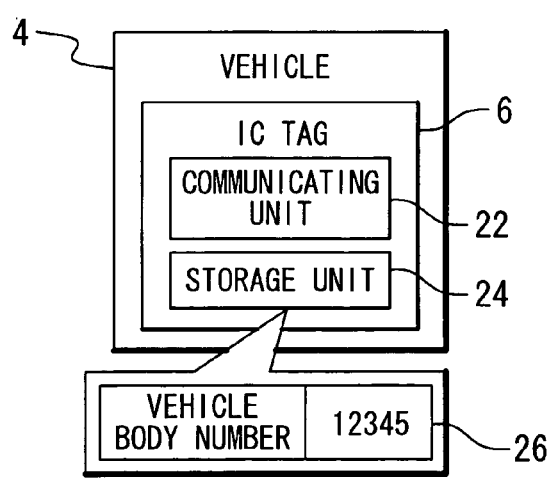
FIG. 4 is a diagram for illustratively showing a structure of an IC tag attached to a vehicle in the parts assembly management system of FIG. 1.

Referring to FIG. 2, FIG. 3, and FIG. 4, a detailed description of the parts assembly management system 1 is given in the following. As shown in FIG. 4, each IC tag 6 includes a communicating unit 22 and a storage unit 24. The storage unit 24 stores therein a vehicle body number 26 used for identifying the associated vehicle 4.

As shown in FIG. 2, the reading apparatus 8 is provided with a reader unit 28 and a communicating unit 30. The reader unit 28 is designed to communicate with the communicating units 22 of the IC tags 6, and to thereby obtain information from the storage units 24 within the IC tags 6.

The parts assembly management terminal 10 is composed of an input unit 32, a processing unit 34, a communicating unit 36, and a storage unit 37. The communicating unit 36 is communicable to the communicating unit 30 of the reading apparatus 8 and a communicating unit 42 (will be explained later) of the transmission apparatus 12. The storage unit 37 stores therein an assembly table 38 and a parts storage table 39.

The transmission apparatus 12 is equipped with a transmitting unit 40 and the communicating unit 42. The IC tag 18, which are respectively provided for the parts storage boxes 16, is each composed of a communicating unit 44, a processing unit 46, an output unit 48, and a storage unit 50. The communicating unit 44 within the each IC tag 18 receives a signal transmitted from the transmitting unit 40 of the transmission apparatus 12. The storage unit 50 stores therein a parts storage box ID 52 identifying the associated parts storage box 16.

FIG. 5 illustrates a structure of the assembly table 38. The assembly table 38 contains a plurality of process step IDs 54 (one shown). The process step IDs 54 are each associated with a work space where one worker 14 is arranged. In other words, the process step IDs 54 are numbers or codes identifying process steps respectively allocated to the workers 14 working for the assembly line 2. The assembly table 38 further contains an association of vehicle body numbers 26, used for identifying the vehicles 4, with parts numbers 56 identifying parts to be assembled to the respective vehicles 4.

FIG. 6 illustrates a structure of the parts storage table 39. The parts storage table 39 stores therein an association of parts storage box IDs 52 with parts numbers 56 identifying parts stored in the parts storage boxes 16, identified by the parts storage box IDs 52.

The parts storage box IDs 52 may be identical to the associated part numbers 56. Defining the parts storage box IDs 52 as being identical to the associated parts numbers 56 eliminates the need for providing the parts storage table 39. In this case, the parts storage boxes 16 are identified on the basis of the contents of the assembly table 38. Such architecture preferably simplifies the structure of the parts assembly management system 1.

Alternatively, the parts storage box IDs 52 may be different from the associated part numbers 56. This architecture preferably allows easily changing parts to be stored in the parts storage box 16; the exchange of parts only requires the parts assembly management system 1 to update the parts storage table 39.

Figure 7:
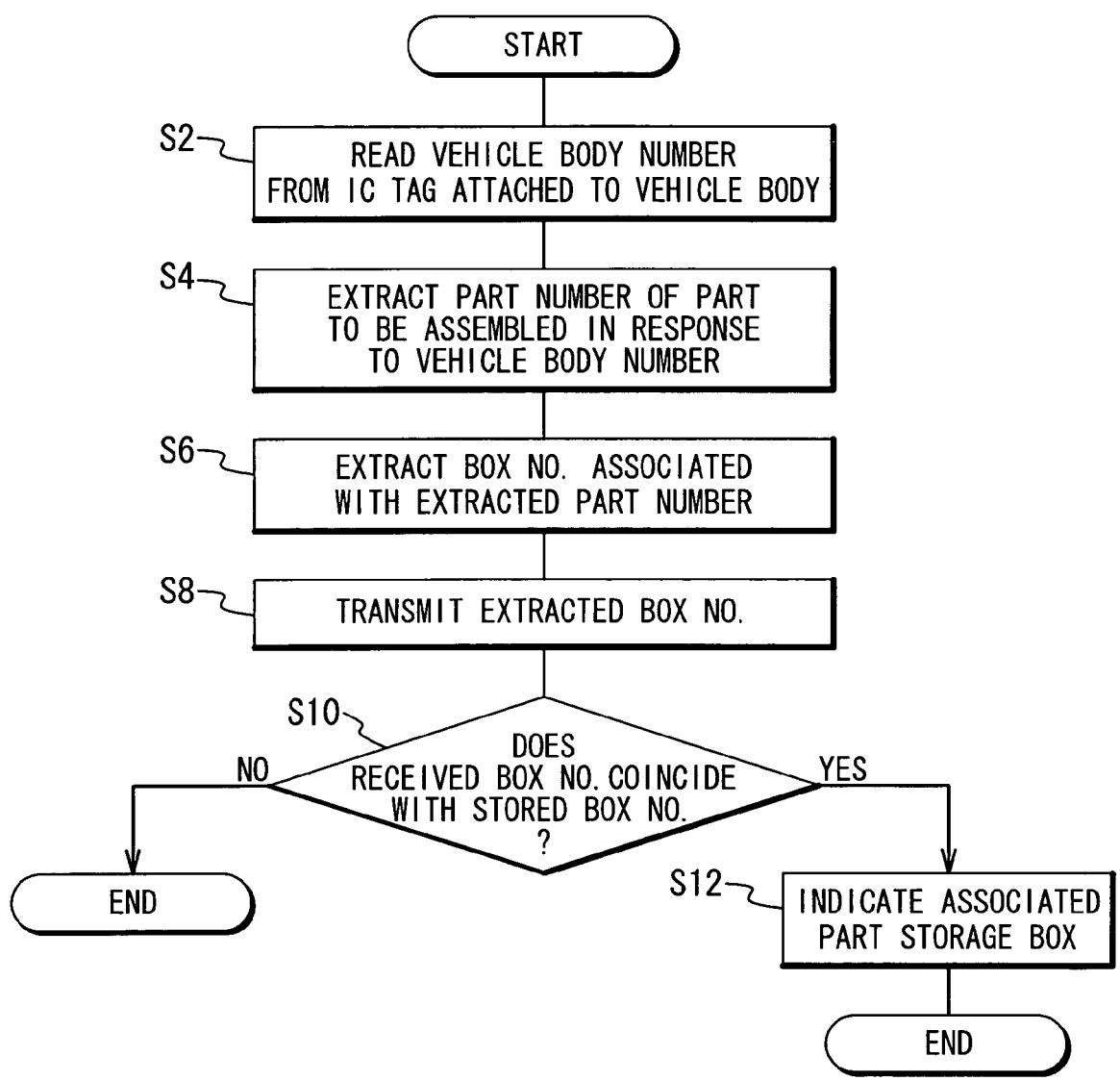
FIG. 7 is a flow chart for describing operations of the parts assembly management system shown in FIG. 1.

FIG. 7 is a flow chart for explaining operations of the parts assembly management system 1.

At Step S2, the vehicles 4, attached with the IC tags 6, are conveyed along the assembly line 2. When one vehicle 4 reaches a predetermined position, the reader unit 28 of the reading apparatus 8 contactlessly obtains a vehicle body number 26 stored in the attached IC tag 6. The received vehicle body number 26 is transmitted to the parts assembly management terminal 10 by the communicating unit 30.

At Step S4, the communicating unit 36 of the parts assembly management terminal 10 receives the vehicle body number 26 transmitted from the communicating unit 30, and the processing unit 34 performs table look-up on the assembly table 28, and thereby extracts the parts numbers 56 associated with the received vehicle body number 26. In FIG. 5, parts numbers A-1, B-3, C-1, - - - , are extracted, which are associated with a vehicle number "12345".

At Step S6, the processing unit 34 performs table look-up on the parts storage table 39 to retrieve a specific parts storage box ID 53 for each of the parts numbers 56 extracted at Step S4; the specific parts storage box ID 53 is defined as being the parts storage box ID 52 associated with each associated parts number 56 extracted at Step S4. In FIG. 6, the specific parts storage box ID 53 associated with the parts number A-1 is extracted.

At Step S8, the communicating unit 36 transmits the extracted specific parts storage box ID 53 to the transmission apparatus 12. When the communicating unit 42 of the transmission apparatus 12 receives the specific parts storage box ID 53, the transmitting unit 40 transmits the specific parts storage box ID 53 to the IC tags 18, respectively attached to the parts storage boxes 16.

At Step S10, when the communicating units 44 of the IC tags 18 each receive the specific parts storage box ID 52, the processing unit 46 of each IC tag 18 compares the received specific parts storage box ID 53 with the parts storage box ID 52 previously stored into the associated storage unit 50. When the received specific parts storage box ID 53 is not identical to the stored parts storage box ID 52, the procedure is aborted.

At Step S12, when the received specific parts storage box ID 53 agrees to the stored parts storage box ID 52 at Step S10, the output unit 48 of the relevant IC tag 18 outputs an indication indicative of the relevant parts storage box 16 to which the relevant IC tag 18 is attached. The indication may include light emission. In a preferred embodiment, the light-emitting unit 20 of the parts storage box 16 emits light in response to the signal transmitted from the IC tag 18.

The indication output from the output unit 48 or the light emission from the light emitting unit 20 allows the worker 14 to easily distinguish the parts storage box 16 into which the parts to be assembled are stored. This would be helpful for the worker 14 to pick up the appropriate parts from the associated parts storage box 16, and to assemble the appropriate parts into the vehicles 4.

In summary, the above-described parts assembly management system 1, which is designed to indicate the parts to be assembled into the respective vehicles 4 for the worker 14 by light emission or other means, effectively helps the worker 14 to assemble appropriate parts into the vehicles 4 with reduced parts assembly errors. Additionally, the parts assembly management system 1 is highly adaptable to update of the assembly sequence, and exchange of the workers 14.

Figure 8:
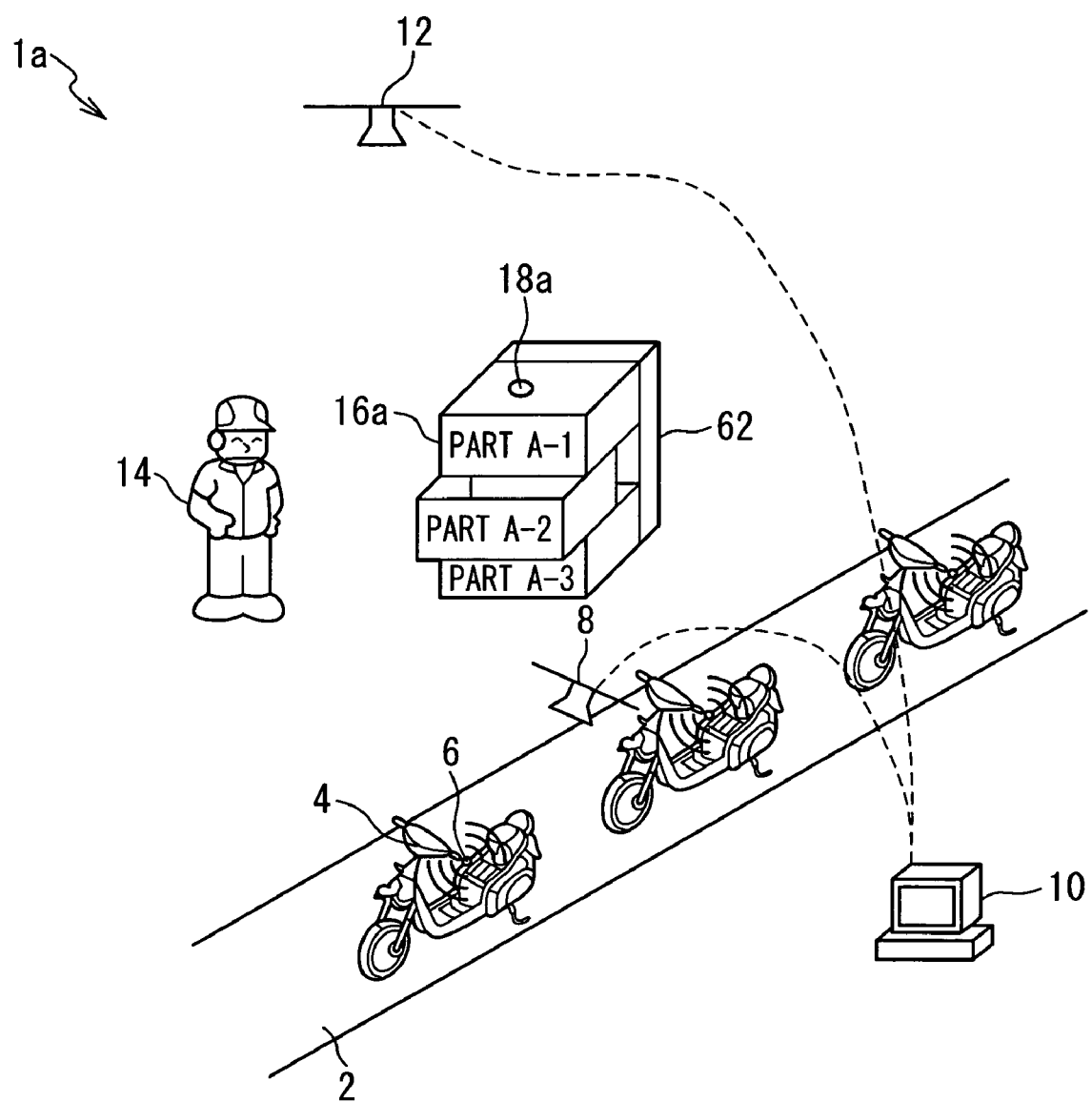
FIG. 8 is a diagram for illustratively showing an entire arrangement of a parts assembly management system according to a modification of the present invention.

In a modified embodiment, a shutter mechanism may be provided for respective parts storage boxes in order to avoid the worker 14 picking up inappropriate parts. FIG. 8 schematically shows an entire arrangement of a parts assembly management system 1a in this modified embodiment. The parts assembly management system 1a of this embodiment is equipped with a storage shelf 62 composed of parts storage boxes 16a in place of the parts storage boxes 16. The storage shelf 62 is equipped with electronic key mechanisms and actuators to open or close the parts storage boxes 16a, individually. Initially, all of the parts storage boxes 16a are "closed" through locking the electronic key mechanisms. In order to "open" one of the parts storage boxes 16a, the associated electronic key mechanism is released, and the parts storage box 16a to be opened is drawn out of the storage shelf 62 by the associated actuator. This provides the worker 14 with easy access to the parts stored in the "opened" parts storage box 16a. In order to "close" one of the parts storage boxes 16a, on the other hand, the parts storage box 16a to be closed is withdrawn into the storage shelf 62 by the associated actuator, and is locked by the associated electronic key mechanism. This disenables the worker 14 to pick up the parts from the "closed" parts storage box 16a.

Figure 9:
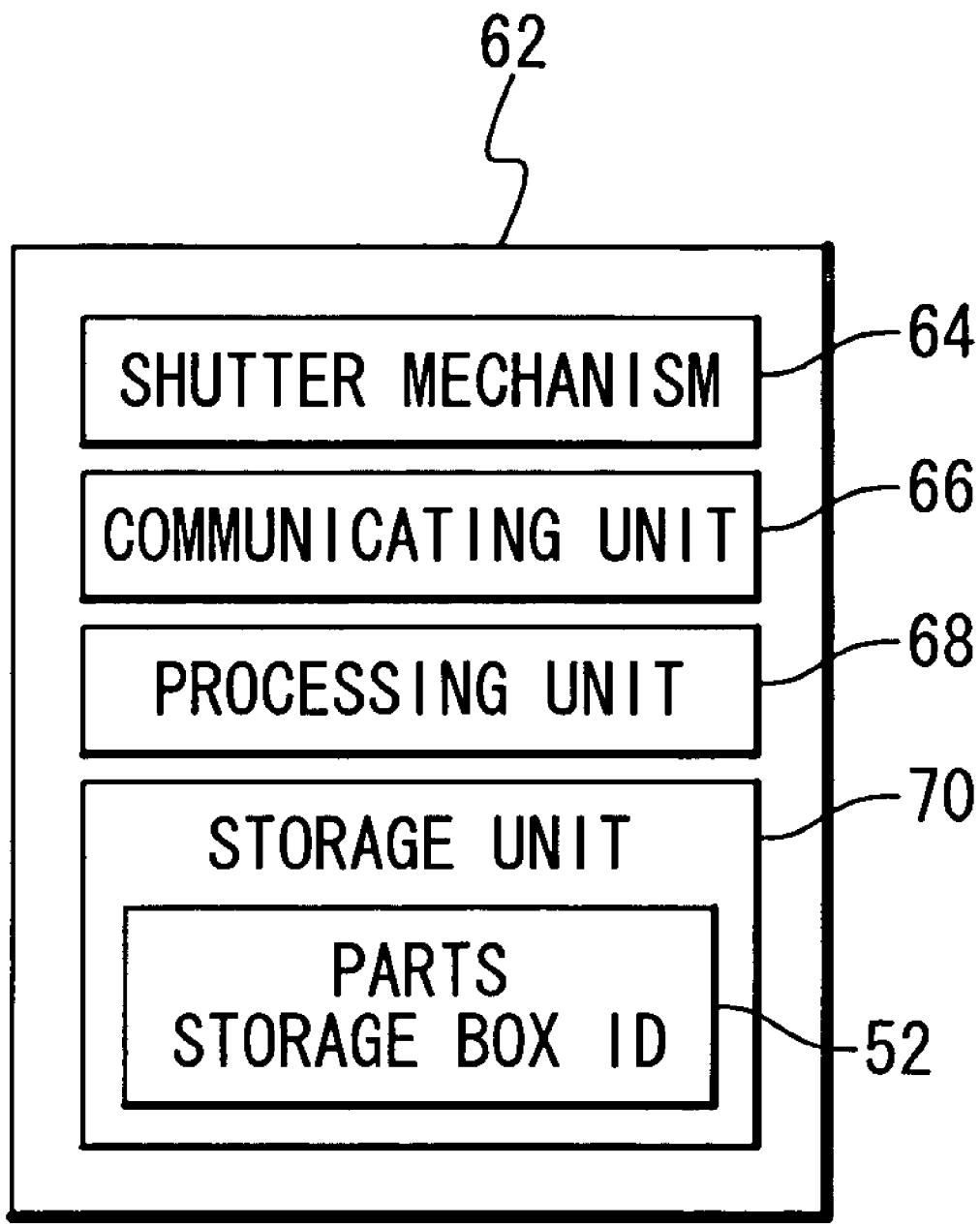
FIG. 9 is a diagram for illustratively showing a structure of a parts shelf employed in the parts assembly management system shown in FIG. 8.

FIG. 9 shows a structure of the storage shelf 62. The storage shelf 62 is equipped with a shutter mechanism 64, a communicating unit 66, a processing unit 68, and a storage unit 70. The shutter mechanism 64 individually opens and closes the parts storage boxes 16a by using the above-described electronic key mechanisms and actuators. The communicating unit 18a receives a signal transmitted from the transmission apparatus 12. The storage unit 70 stores therein parts storage box IDs 52 identifying the parts storage boxes 16a.

Operations of the parts assembly management system 1a in this modified embodiment are almost identical to those of the parts assembly management system 1 shown in FIG. 1, except for the operations at step S12 shown in FIG. 7. In this modified embodiment, after the specific parts storage box ID 53 received at Step S10 is compared with the parts storage box ID 52 stored in the storage unit 50, the shutter mechanism 64 "opens" the parts storage box 16a associated with the specific parts storage box ID 53 when the specific parts storage box ID 53 is identical to the parts storage box ID 52 stored in the storage unit 50. The parts storage box 16a is preferably equipped with a display unit for allowing the worker 14 to easily and visibly recognize that the parts storage box 16a is opened. The worker 14 is allowed to pick up appropriate parts from the opened parts storage box 16a, and to assemble the appropriate parts to the vehicles 4.

As thus described, the parts assembly management system 1a in this embodiment effectively prevents the worker 14 from picking up improper parts from the parts storage box 16a, and thereby effectively avoids improper parts being mistakenly assembled into the vehicles.

In an alternative embodiment, each of the parts storage boxes may include an IC tag and an electronic key mechanism for opening and closing the lid thereof. The lid is opened when the specific parts storage box ID 53 is identical to the associated parts storage box ID 52; otherwise the lid is closed and locked by the electronic key mechanisms. This architecture achieves the same effects.

Figure 10:
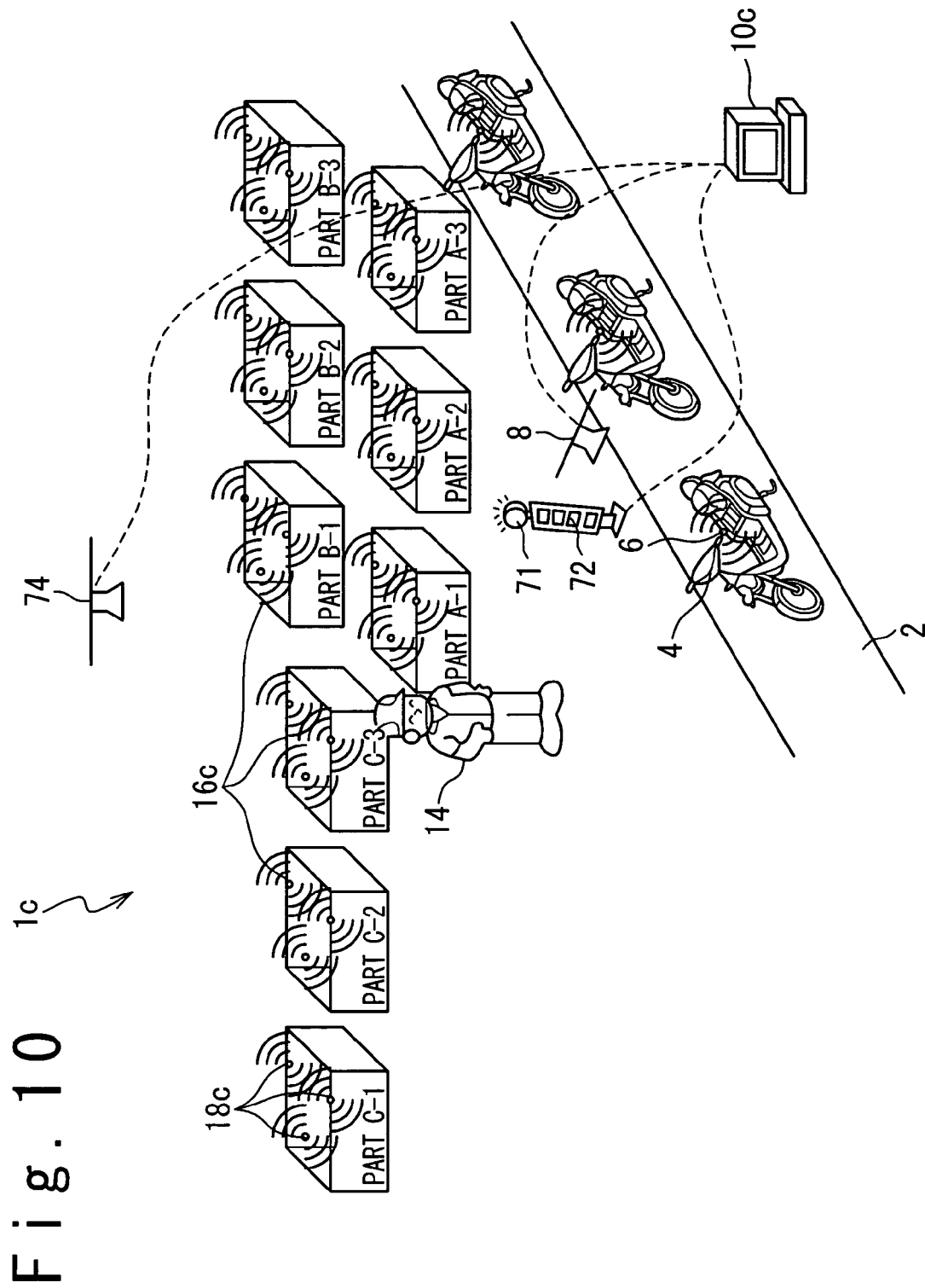
FIG. 10 is a diagram for illustratively showing an entire arrangement of a parts assembly management system according to another embodiment of the present invention.

In another improved embodiment, as shown in FIG. 10, a parts assembly management system, denoted by numeral 1c, may be designed to be confirm that appropriate parts are assembled into the vehicles 4, on the basis of the traveling distances of the respective parts during manufacture. The parts assembly management system 1c is used in combination with an assembly line 2 conveying vehicles 4. The assembly line 2 is typically equipped with a belt conveyor, and the like. A worker 14 is arranged at a predetermined position of the assembly line 2. The worker 14 is obliged to assemble appropriate parts into the vehicles 4.

IC tags 6 adapted to an RF-ID system are attached to the vehicles 4. Necessary information is previously stored in the IC tags 6 before the vehicles 4 are loaded on the assembly line 2, and the resulting IC tags 6 are attached to the vehicles 4. A reading apparatus 8 adapted to the RF-ID system is installed at a predetermined position of the assembly line 2. The reading apparatus 8 is designed to read the information stored in the IC tags 6.

The reading apparatus 8 is connected to a parts assembly management terminal 10c. A personal computer or a workstation may be used as the parts assembly management terminal 10c. The parts assembly management terminal 10c is connected to a reading apparatus 72.

A plurality of parts storage boxes 16c are provided along the assembly line 2 for storing parts to be assembled into the vehicles 4. Each parts storage box 16c stores therein a preselected sort of parts. The parts stored in the parts storage boxes 16c are each attached with an IC tag 18c.

Figure 11:
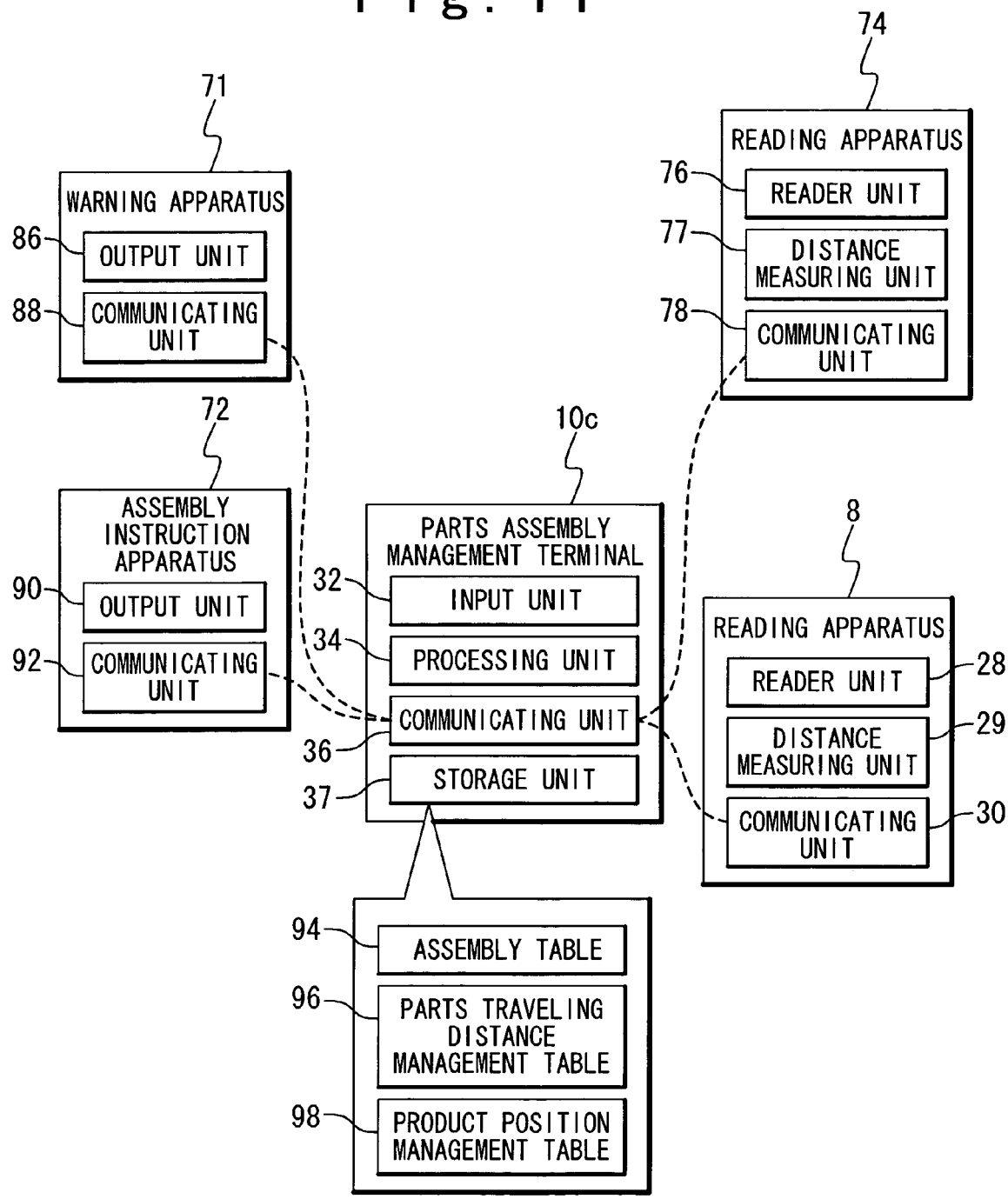
FIG. 11 is a schematic block diagram for representing a detailed arrangement of the parts assembly management system of FIG. 10.
Figure 12:
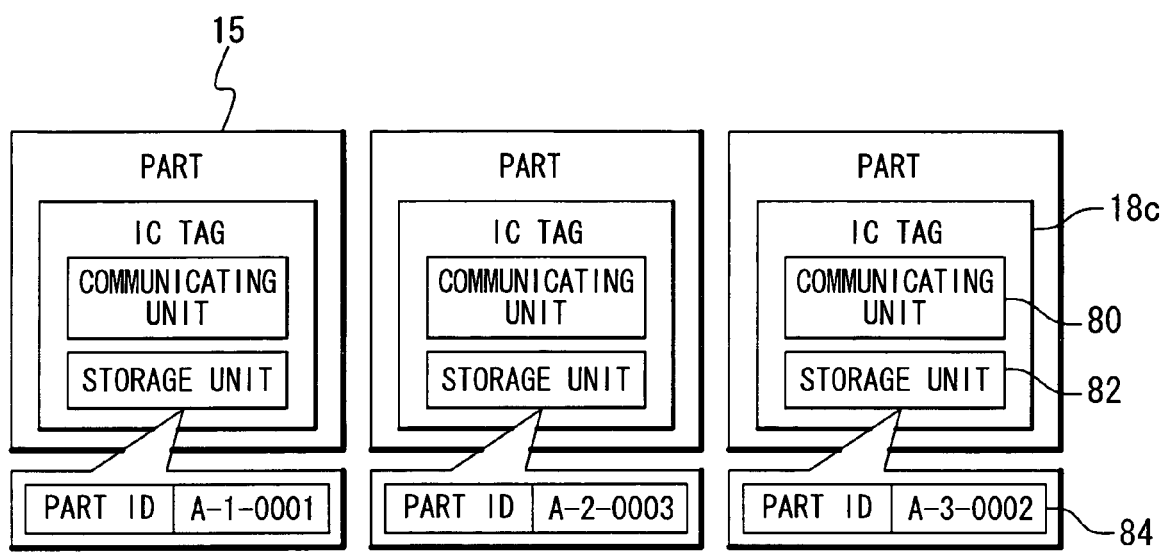
FIG. 12 is a diagram for illustratively showing a structure of IC tags attached to parts employed in the parts assembly management system of FIG. 10.
Figure 13:
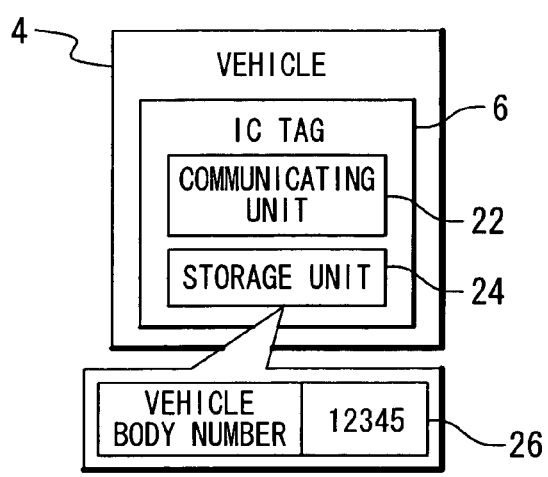
FIG. 13 is a diagram for illustratively representing a structure of an IC tag attached to a vehicle in the parts assembly management system of FIG. 10.

Referring to FIG. 11, FIG. 12, and FIG. 13, a detailed description of the parts assembly management system 1c is given in the following. As shown in FIG. 13, each IC tag 6, attached to the associated vehicle 4, includes a communicating unit 22 and a storage unit 24. The storage unit 24 stores therein a vehicle body number 26 used for identifying the associated vehicle 4.

As shown in FIG. 11, the reading apparatus 8 is provided with a reader unit 28, a distance measuring unit 29, and a communicating unit 30. The reader unit 28 is adapted to communicate with the communicating unit 22 of the IC tag 6 and to thereby read out information from the storage unit 24 of the IC tag 6. The distance measuring unit 29 measures a distance between the reading apparatus 8 and the IC tag 4 by using electromagnetic waves exchanged between the communicating unit 30 of the reading apparatus 8 and the communicating unit 22 of the IC tag 6 for communications therebetween. A technique is in the public domain which determines a distance between a reading apparatus and a target object on the basis of the duration necessary for electromagnetic waves being exchanged between the reading apparatus and the target object, and the propagation speeds of the exchanged electromagnetic waves. An example of this technique is disclosed in "DENPPA GIJITSU HANDBOOK" issued by NIKKAN KOGYO SHINBUN in November 1988. The distance measuring unit 29 measures the distance between the reading apparatus 8 and the IC tag 6 by using the above-described technique.

The parts assembly management terminal 10c is equipped with an input unit 32, a processing unit 34, a communicating unit 36, and a storage unit 37. The communicating unit 36 is designed to communicate with the communicating unit 30 of the reading apparatus 8 and a communicating unit 76 of a reading apparatus 74 (will be explained later). The storage unit 37 stores therein an assembly table 94, a parts traveling distance management table 96, and a product position management table 98.

The reading apparatus 74 is provided with a reader unit 76, a distance measuring unit 77, and a communicating unit 78. Each of the parts storage boxes 16c accommodates a specific sort of parts 15. The distance measuring unit 77 measures the distance between the reading apparatus 74 and each IC tag 18c through the aforementioned technique. More specifically, the distance measuring unit 77 determines the distance between the reading apparatus 74 and each IC tag 18c on the basis of electromagnetic waves exchanged between the reading apparatus 74 and each IC tag 18c.

The parts 15 are each attached with the IC tag 18c. Each IC tag 18c is equipped with a storage unit 82 and a communicating unit 80. This communicating unit 80 is adapted to communicate with the reader unit 76 of the reading apparatus 74. The storage unit 82 stores therein a parts ID 84 identifying the associated parts 15.

The parts ID 84 is described in a predetermined format, containing a parts number 56 identifying the sort of the associated parts 15. For instance, the parts 15, the sort of which is identified by the parts number 56 of "A-1", may be individually identified with the parts ID 84 that includes an additional number following the part number 56, such as "A-1-0001", and "A-1-0002".

The warning apparatus 71 is equipped with an output unit 86 and a communicating unit 88. The output unit 86 sonically and/or visually issues warning to the worker 14. The communicating unit 88 is adapted to communicate with the communicating unit 36 of the parts assembly management terminal 10c.

The assembly instruction apparatus 72 is equipped with an output unit 90 and a communicating unit 92. The output unit 90 may include a monitor for displaying characters and/or images. The communicating unit 92 of the assembly instruction apparatus 72 is adapted to communicate with the communicating unit 36 of the parts assembly management terminal 10c.

Figure 14:
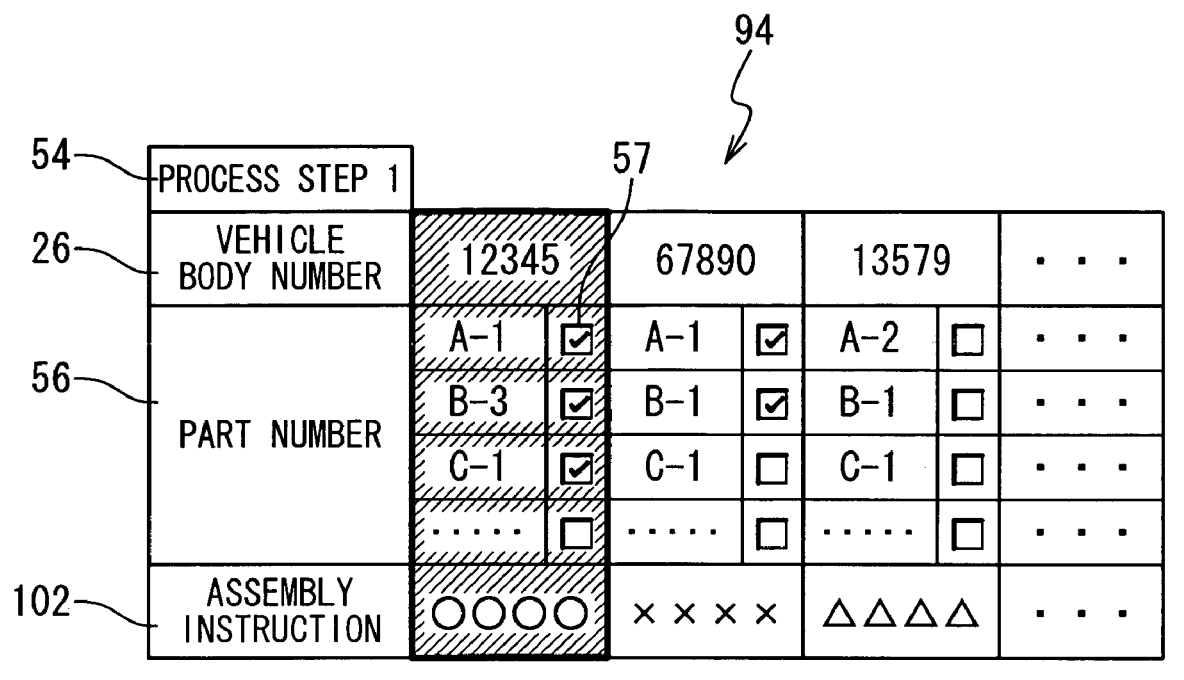

FIG. 14 illustrates a structure of the assembly table 94. The assembly table 94 contains therein an association of a plurality of process step IDs 54 with vehicle body numbers 26, parts numbers 56, and assembly instructions 102. The assembly table 94 additionally contains check boxes 57 associated with the respective parts numbers 56. Each of the check boxes 57 is allowed to be placed in the "ON" state (that is, the checked state) or the "OFF" state (that is, the unchecked state). Initially, all of the check boxes 57 are placed into the "OFF" state.

FIG. 15 illustrates a structure of the parts traveling distance management table 96. The parts traveling distance management table 96 contains therein parts IDs 84 identifying parts, the current distances 104 of the respective parts from the reading apparatus 8, which are measured at a present time instant, the previous distances 106 of the respective parts from the reading apparatus 8, which has been measured one second before, and traveling distances 108 of the respective parts.

FIG. 16 illustrates a structure of the product position management table 98. The product position management table 98 stores therein an association of the process step IDs 54 with parts assembly distances 110 (one of each shown). The parts assembly distances 110 are defined on the basis of the arrangement of the work spaces prepared for the respective workers 14; each work space is defined within the assembly line 2 as being the space between a predetermined position and a position displaced toward downstream by the associated parts assembly distance 110 from the predetermined position. In addition, the product position management table 98 stores therein an association of vehicle body numbers 26 with distances 112 of the vehicles 4 from the reading apparatus 8, assembled parts list 114 representative of the parts 15 that have already assembled into the respective vehicles 4, and parts assembling statuses 116 representative of whether the respective vehicles 4 are assembled with all the required parts 15, each selected out of the "complete" status or the "incomplete" status.

Figure 17:
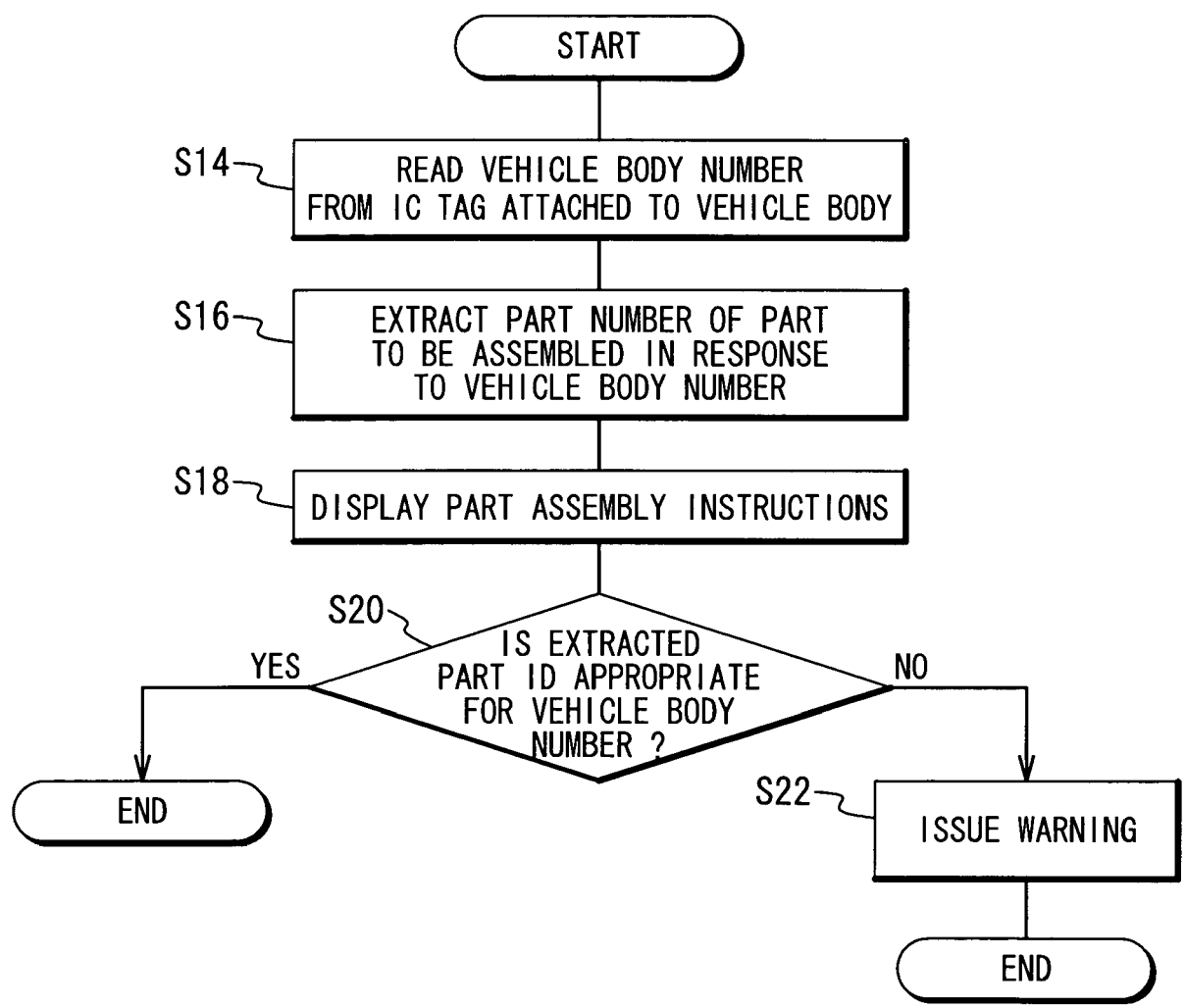
FIG. 17 is a flow chart for describing operations of the parts assembly management system shown in FIG. 10.

FIG. 17 is a flow chart for explaining operations of the parts assembly management system 1c according to this embodiment.

At Step S14, the vehicles 4, each attached with the IC tag 6 are conveyed along the assembly line 2. When a specific vehicle 4 reaches a predetermined position, the reader unit 28 of the reading apparatus 8 contactlessly obtains the vehicle body number 26 stored in the IC tag 6 attached to the specific vehicle 4. The obtained vehicle body number 26 is transmitted to the parts assembly management terminal 10c by the communicating unit 30.

At Step S16, after the communicating unit 36 of the parts assembly management terminal 10c receives the vehicle body number 26 transmitted from the communicating unit 30, the processing unit 34 performs table look-up on the assembly table 94 to extract the parts numbers 56 associated with the received vehicle body number 26, and the associated assembling instruction 102.

At Step S18, the communicating unit 36 transmits the extracted assembling instruction 102 to the assembly instruction apparatus 72. After receiving the assembly instruction 102 by the communicating unit 92, the assembly instruction apparatus 72 displays the received assembly instruction 102 on the output unit 90.

At Step S20, the worker 14 is prompted to pick up appropriate parts 15 from the parts storage box 16c with reference to the assembly instruction 102 displayed on the assembly instruction apparatus 72. In the meantime, the reader unit 76 receives the parts IDs 84 from the IC tags 18c, which are each attached to the parts 15. The received parts IDs 84 are transmitted to the parts assembly management terminal 10c. The distance measuring unit 77 communicates with the IC tags 18c to measure distances between the reading apparatus 74 and the IC tags 18c at predetermined time intervals, typically, at intervals of one second. The length of the time intervals is determined so that erroneous work is immediately detected. The measured distances are transmitted to the parts assembly management terminal 10c.

When the parts assembly management terminal 10c receives the parts IDs 84 and the measured distances, the processing unit 34 stores the received parts IDs 84 and measured distances into the parts traveling distance management table 96. The processing unit 34 calculates absolute values of differences between the distances 104 from the reading apparatus 8, which are most lately measured, and the distances 106 from the reading apparatus 8, which are measured one second ago, and then stores the calculated absolute values as the traveling distances 108 in the parts traveling distance management table 96.

The processing unit 34 refers to the parts traveling distance management table 96, and extracts the parts ID(s) 84 associated with the part(s) 15 that exhibits the traveling distance(s) 108 longer than a predetermined distance. The processing unit 34 extracts the parts number(s) 56 contained in the extracted parts ID(s) 84, and compares the extracted parts number(s) 56 with the parts number(s) 56 associated with the vehicle body number 26 of the specific vehicle 4 with reference to the assembly table 94. When the extracted parts number(s) 56 is identical to any of the parts number(s) 56 associated with the specific vehicle 4, the procedure is completed.

At Step S22, when the extracted parts number(s) 56 does not coincide with any of the parts number(s) 56 associated with the specific vehicle 4 in the assembly table 94, the communicating unit 36 transmits a predetermined signal to the warning apparatus 71. When the communicating unit 88 of the warning apparatus 71 receives this predetermined signal, the output unit 86 of the warning apparatus 71 sonically and/or visually issues warning to the worker 14. The warning allows the worker 14 to recognize that the parts picked up by the worker 14 are inappropriate to be assembled to the specific vehicle 4. This effectively prompts the worker 14 to return the inappropriate parts to the associated parts storage box 16c, and to select appropriate parts.

In summary, the parts assembly management system 1c is designed to issue warning immediately after the worker 14 picks up the parts inappropriate to be assembled to the vehicle 4. As a consequence, the parts assembly management system 1c effectively suppress a situation wherein the worker mistakenly assembles the erroneous parts. Furthermore, the parts assembly management system 1c reduces time required to correct the erroneous assembling work.

In a preferred embodiment, the processing unit 34 manages information on the parts 15 which have been assembled to a specific vehicle 4 in accordance with the below-mentioned method (1), or (2):

(1) The processing unit 34 performs table look-up on the parts traveling distance management table 96 with the parts IDs 84 used as retrieval keys, the parts IDs 84 including the part numbers 56 associated with the vehicle body number 26 received from the reading apparatus 8 in the assembly table 94, and thereby retrieves the traveling distances 108 associated with the parts IDs 84 used as the retrieval keys. When the traveling distances 108 are equal to or longer than a predetermined distance, the processing unit 34 judges that the associated parts 15 identified by the parts IDs 84 used as the retrieval keys have been assembled into the specific vehicle 4, and then, updates the assembled parts list 114 associated with the vehicle body number 26 to include the associated parts IDs 84 in the product position management table 98. The processing unit 34 furthermore places the check box(es) associated with the parts number(s) 56 of the assembled part(s) into the "ON" state in the assembly table 94.

(2) Alternatively, the distance measuring unit 29 determines a distance (referred to as a first distance, hereinafter) between the communicating unit 22 and the IC tag 6 mounted on the vehicle 4. Additionally, the distance measuring unit 29 calculates distances (referred to as second distances, hereinafter) between the communicating unit 22 and the IC tags 18c attached to the parts 15. The communicating unit 30 of the reading apparatus 8 transmits both the first distance and the second distances to the parts assembly management terminal 10c. When the communicating unit 36 of the parts assembly management terminal 10c receives the first distance and the second distances, the processing unit 34 thereof compares the second distances with the first distance. When the second distance of a specific part 15 from the communicating unit 22 is in the range determined on the basis of the dimension of the specific vehicle 4 around the first distance, the processing unit 34 judges that the specific part 15, positioned the second distance away from the communicating unit 22, is assembled into the specific vehicle 4, and then updates the assembled parts list 114 associated with the vehicle body number 26 of the specific vehicle 4 in the product position management table 98 so as to include the part ID of the specific part 15. The processing unit 34 further places the check box 57 associated with the parts number 56 of the assembled part into the "ON" state, in the assembly table 94.

The processing unit 34 transmits an instruction signal to the assembly instruction apparatus 72, and thereby instructs the assembly instruction apparatus 72 to stop outputting the information associated with the parts associated with the check box 57 placed into the "ON" state in the assembling instruction 102. Upon receiving this instruction signal, the assembly instruction apparatus 72 stops outputting the information associated with the relevant part.

When all of the check boxes 57 associated with a specific vehicle body number 26 in the assembly table 94 are placed into the "ON" state, the processing unit 34 places the parts assembly status 116 associated with the specific vehicle body number 26 into the "complete" state in the product position management table 98.

The distance measuring unit 29 calculates an estimated distance between the communicating unit 22 and the IC tag 6, which is approximately identical to the distance between reading apparatus 8 and the specific vehicle 4. The communicating unit 22 transmits the estimated distance to the parts assembly management terminal 10c. When the communicating unit 36 receives the estimated distance, the processing unit 34 extracts the associated parts assembling distance 110 with reference to the product position management table 98. The processing unit 34 judges whether the estimated distance is longer than, or equal to the parts assembling distance 110. When the estimated distance is equal to or longer than the parts assembling distance 110, the processing unit 34 extracts the parts assembly status 116 from the product position management table 98. The processing unit 34 then transmits a predetermined signal to the warning apparatus 71, when the extracted parts assembly status 116 is the "incomplete" state. When the communicating unit 88 of the warning apparatus 71 receives the predetermined signal, the output unit 86 of the warning apparatus 71 sonically and/or visually issues warning to the worker 14. The warning may involve generating a warning sound, or turning on a lamp.

The parts assembly management system 1c thus constructed can immediately detect the assembly errors; when a specific vehicle 4 is about to go through a process step without being assembled with necessary parts, the parts assembly management system 1c issues warning to the worker 14 responsive for the relevant process step within the assembly line 2.

It should be noted that the parts assembly management system 1c in this embodiment involves attaching the IC tags 18c with the parts 15, which are assembled into the final products (that is, the vehicles 4). This is effective for improving traceablity of the respective parts 15 as well as for helping parts assembly. The IC tags 18c can be used for identifying the parts 15 after the vehicles 4 are commercially distributed.

When a specific sort of parts is found to experience a certain problem, production lots, marketing terms, and manufacturers relevant to the parts experiencing the problem would be easily identified by parts IDs stored in the IC tags 18c. This helps proper actions to be taken within a short time for the problem. The parts ID may each include a lot number for identifying the production lot, instead of an identifier identifying the part. The above-explained effect is also achieved by this architecture.

Although there have been described what are the present embodiments of the invention, it will be understood by persons skilled in the art that modifications and variations may be made thereto within the scope of the invention, as indicated by the appended claims.

What is claimed is:

1. A parts assembly management system comprising:
   a parts assembly management apparatus to be installed in an assembly line for automatically conveying a product; and
   a plurality of storage vessel identifying apparatuses to be installed in a plurality of storage vessels which store therein parts to be assembled to said product,
   wherein said parts assembly management apparatus includes:
   a reading apparatus for contactlessly reading a product identifier identifying said product from an IC tag attached to said product;
   a storage unit for storing therein an assembling table containing an association of product identifiers with vessel identifiers identifying said plurality of storage vessels;
   a first processing unit for extracting, out of said vessel identifiers within said assembly table, a vessel identifier associated with said product identifier identifying said product; and
   a transmitting unit for transmitting said associated vessel identifier to said storage vessel identifying apparatuses; and
   wherein each of said storage vessel identifying apparatuses includes:
   a receiving unit receiving said associated vessel identifier from said transmitting unit;
   a storage unit storing therein a specific vessel identifier identifying an associated one of said storage vessels;
   a second processing unit performing comparison between said associated vessel identifier received by said receiving unit and said specific vessel identifier; and
   an output unit for outputting a result of said comparison.

2. The parts assembly management system according to claim 1, further comprising:
   a shutter mechanism for opening or closing an associated one of said storage vessels in response to said result of said comparison.

3. A parts assembly management apparatus used for an assembly line automatically conveying a product, comprising:
   a storage unit for storing therein an assembling table containing an association of a product identifier identifying said product with parts identifiers identifying parts to be assembled to said product;
   a product reading apparatus for contactlessly reading a product identifier from a product IC tag attached to said product;
   a parts reading apparatus for contactlessly reading parts identifiers from parts IC tags attached to parts;
   a first output unit for displaying thereon an assembling instruction associated with a product identifier identifying said product;
   a processing unit which calculates respective traveling distances over which said parts IC tags have traveled during a predetermined period of time, extracts a specific parts identifier stored in a specific parts IC tag which has traveled over a traveling distance exceeding a predetermined value, and compares said specific parts identifier and said parts identifiers associated with said product identifier read from said product IC tag by said product reading apparatus with reference to said assembling table; and a second output unit for outputting a result of said comparison.

4. The parts assembly management apparatus according to claim 3, wherein said processing unit determine distances between said parts reading apparatus and said parts by employing a duration required for an exchange of electromagnetic waves between said parts reading apparatus and said parts IC tags, and a propagation speed of said electromagnetic waves, and calculate said traveling distances of said parts IC tags based on differences in said distances between said parts reading apparatus and said parts at a beginning and an end of said predetermined period.

5. A parts management method for an assembly line automatically conveying a product, comprising:

providing an assembling table database relating product identifiers with vessel identifiers identifying a plurality of storage vessels containing parts to be assembled to said product;

providing a specific vessel identifier for each of a plurality of storage vessel identifying apparatuses respectively installed to said plurality of storage vessels;

contactlessly reading a product identifier identifying said product from a radio frequency emitting IC tag attached to said product;

extracting a relevant vessel identifier associated with said product identifier identifying said product from said vessel identifiers described within said assembling table database;

wirelessly transmitting said relevant vessel identifier to said plurality of storage vessel identifying apparatuses;

comparing said relevant vessel identifier and said specific vessel identifier by each of said vessel identifying apparatuses;

outputting a result of said comparison by each of said vessel identifying apparatuses.

6. The parts management method according to claim 5, further comprising:

opening or closing an associated one of said storage vessels in response to said result of said comparison.

7. A parts management method for an assembly line automatically conveying a product, comprising:

providing an assembling table containing an association of a product identifier identifying said product with parts identifiers identifying parts to be assembled to said product;

contactlessly reading a product identifier from a product IC tag attached to said product;

contactlessly reading parts identifiers from parts IC tags attached to said parts;

displaying an assembling instruction associated with said product identifier identifying said product;

calculating respective traveling distances over which said parts IC tags have traveled during a predetermined period of time;

extracting a specific parts identifier stored in a specific IC tag selected out of said parts IC tags, said specific IC tag having traveled over a traveling distance exceeding a predetermined value;

comparing said specific parts identifier and said parts identifiers associated with said product identifier read from said product IC tag with reference to said assembling table; and outputting a result of said comparison.

8. The parts management method according to claim 7, wherein said calculating step includes:

determining distances between said parts and a parts reading apparatus used for contactlessly reading said parts identifiers from said parts IC tags, based on a duration required for an exchange of electromagnetic waves between said parts reading apparatus and said parts IC tags, and a propagation speed of said electromagnetic waves; and calculating said traveling distances of said parts IC tags based on differences in said distances between said parts and said parts reading apparatus at a beginning and an end of said predetermined period.

9. A computer-implemented program for operating a parts assembly management apparatus for an assembly line automatically conveying a product, which apparatus stores therein an assembling table containing an association of a product identifier identifying said product with parts identifiers identifying parts to be assembled to said product, said program comprising:

a code module for contactlessly reading a product identifier from a product IC tag attached to said product;

a code module for contactlessly reading parts identifiers from parts IC tags attached to said parts;

a code module for displaying an assembling instruction associated with said product identifier identifying said product;

a code module for calculating respective traveling distances over which said parts IC tags have traveled during a predetermined period of time;

a code module for extracting a specific parts identifier stored in a specific IC tag selected out of said parts IC tags, said specific IC tag having traveled over a traveling distance exceeding a predetermined value;

a code module for comparing said specific parts identifier and said parts identifiers associated with said product identifier read from said product IC tag with reference to said assembling table; and a code module for outputting a result of said comparison.

10. The computer-implemented program according to claim 9, wherein said code module for calculating said respective traveling distances includes:

a code module for determining distances between said parts reading apparatus and said parts based on a duration required for an exchange of electromagnetic waves between said parts reading apparatus and said parts IC tags, and a propagation speed of said electromagnetic waves, and a code module for calculating said traveling distances of said parts IC tags based on differences in said distances between said parts reading apparatus and said parts at a beginning and an end of said predetermined period.

* * * * *